United States Patent [19]
Uchida et al.

[11] Patent Number: 6,147,454
[45] Date of Patent: *Nov. 14, 2000

[54] DISPLAY UNIT WITH REDUCED LEAKAGE MAGNETIC FIELD

[75] Inventors: Yukio Uchida, Ibaraki; Tomoaki Iwamoto, Katano; Tomohiro Sakata, Takatsuki, all of Japan

[73] Assignee: Matsushita Electronics Corporation, Takatsuki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/186,431

[22] Filed: Nov. 5, 1998

[30] Foreign Application Priority Data

Nov. 17, 1997 [JP] Japan .................................. 9-315610
Nov. 17, 1997 [JP] Japan .................................. 9-315611

[51] Int. Cl.$^7$ ...................................................... H01J 29/56
[52] U.S. Cl. .................................................. 315/85; 315/8
[58] Field of Search ........................... 315/8, 85, 214

[56] References Cited

U.S. PATENT DOCUMENTS

| | | | |
|---|---|---|---|
| 5,049,847 | 9/1991 | Okuyama et al. | 335/214 |
| 5,317,239 | 5/1994 | Ohguro et al. | 315/370 |
| 5,432,492 | 7/1995 | Meershoek | 335/214 |

FOREIGN PATENT DOCUMENTS 5-190115  7/1993  Japan .
6-176714  6/1994  Japan .

OTHER PUBLICATIONS

Patent Abstracts of Japan, publication No. 05190115 A, published Jul. 30, 1993.
Patent Abstracts of Japan, publication No. 06176714 A, published Jun. 24, 1994.

Primary Examiner—David Vu
Attorney, Agent, or Firm—Rosenthal & Osha L.L.P.

[57] ABSTRACT

A display unit that enables reduction in number of additional parts, decrease in leakage magnetic field in a VLF band generated from the display unit in all directions at low cost, and suppression of the leakage magnetic field to the specified value or less according to MPR-II Standard with tolerance is provided. The display unit comprises a cathode-ray tube having a neck portion, a deflection yoke 2 that is mounted at a predetermined position on a periphery of the neck portion, and a driving circuit 3 that has a coil 4 and drives the deflection yoke 2. The driving circuit 3 (the coil 4) is provided at such a position and in such a direction that a magnetic field $E_2$ generated from the driving circuit 3 (the coil 4) cancels out a leakage magnetic field generated $E_1$ from the deflection yoke 2 substantially at the position in front of and 50 cm away from the center of a face panel of the cathode-ray tube.

6 Claims, 11 Drawing Sheets

DISPLAY UNIT WITH REDUCED LEAKAGE MAGNETIC FIELD

FIELD OF THE INVENTION

The present invention relates to a display unit. Particularly, the present invention relates to a technique for suppressing a leakage magnetic field that leaks from a display unit to the outside.

BACKGROUND OF THE INVENTION

The market of display units has expanded rapidly with the rising popularity of personal computers and the like, making display units become commonplace items. In such a situation, it has recently been required to suppress a leakage magnetic field generated around display units to a specified value or less. In connection with such a requirement, there is MPR-II Standard as a standard for a VDU measurement, which is an international standard. MPR-II Standard prescribes that a leakage magnetic field in a VLF band of 2 kHz to 400 kHz should be suppressed to 25 nT or less.

One of the main sources of leakage magnetic fields in an ELF band with a frequency range of 5 Hz to 2 kHz and in a VLF band with a frequency range of 2 kHz to 400 kHz around a display unit is a deflection yoke mounted in a display unit. Various measures have been employed for reducing the amount of a generated leakage magnetic field. Particularly, special measures are required to reduce the amount of a leakage magnetic field in a VLF band. One method for reducing a leakage magnetic field involves attaching one cancel coil or a plurality of cancel coils to the deflection yoke. This kind of deflection yoke is disclosed, for example, in Unexamined Japanese Patent Application Tokkai Hei 5-190115.

Figure 11:
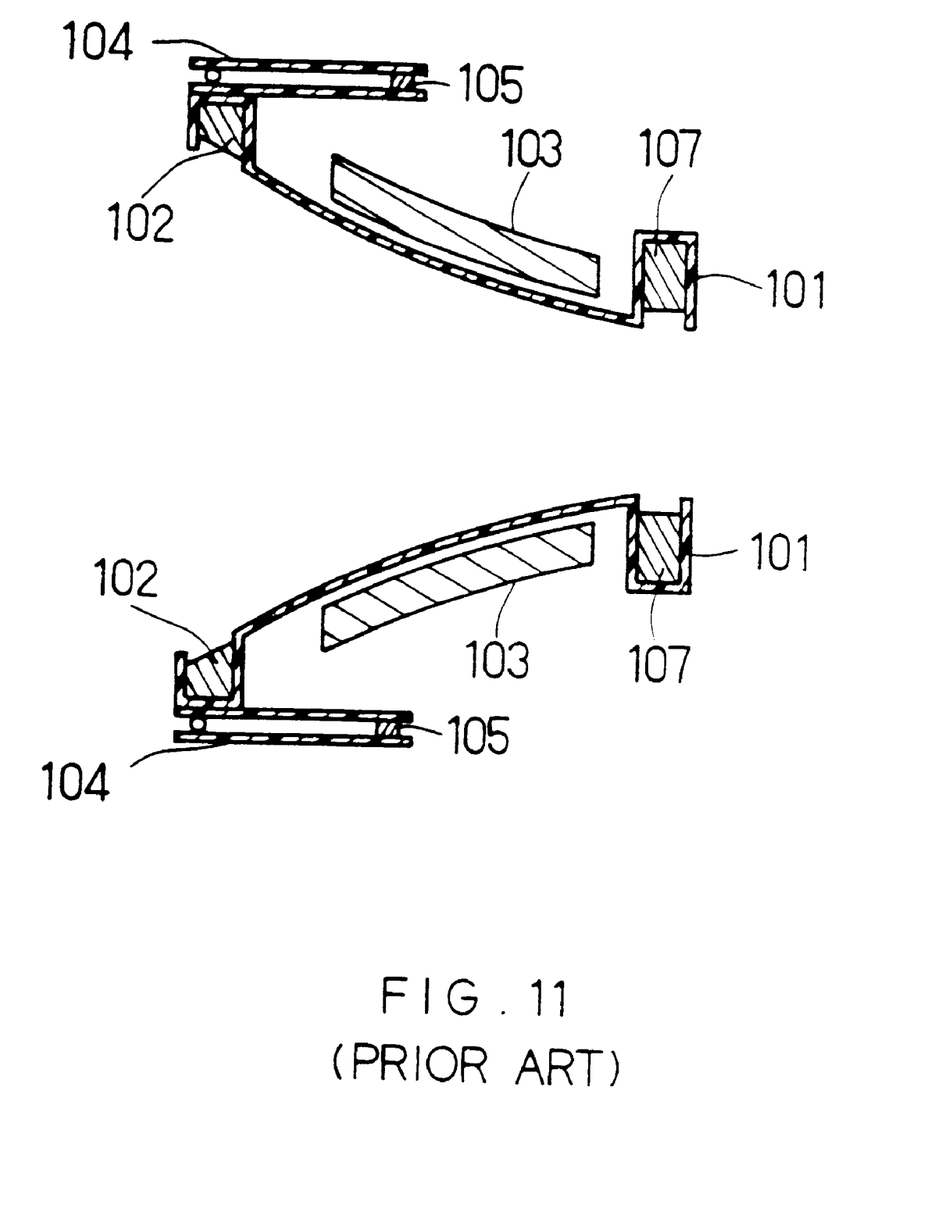
FIG. 11 is a cross-sectional view showing a deflection yoke provided with a means for reducing a leakage magnetic field according to a prior art.

FIG. 11 is a cross-sectional view showing a deflection yoke provided with a means for reducing a leakage magnetic field in the prior art. This deflection yoke comprises a separator 101, a horizontal deflection coil 102 that is wound on the separator 101, a ferrite core 103 that is arranged so as to cover the center portion of the separator 101, a cancel coil bobbin 104 that is arranged so as to cover the front-edge side of the horizontal deflection coil 102, and a cancel coil 105 that is wound with the cancel coil bobbin 104. This deflection yoke is mounted at a predetermined position outside a cathode-ray tube in a display unit. In this case, the cancel coil 105 is formed in a loop shape, and a pair of the cancel coils are provided at the upper and lower portions on the front-edge side of the deflection yoke body. A cancel magnetic field generated on the tube axis of the cathode-ray tube by the cancel coils 105 has two peaks with a reverse polarity to those of a deflection magnetic field generated at the front portion and the rear portion of the deflection yoke body. The cancel magnetic field has a distribution characteristic in which the ratio of the values of the two peaks is substantially the same.

However, in the display unit according to the prior art described above, a pair of cancel coils must be provided at the upper and the lower portions on the front-edge side of the deflection yoke body in order to suppress a leakage magnetic field. Therefore, the number of parts and of manufacturing processes increase. This generally results in low working efficiency in manufacturing the deflection yoke, which eventually leads to a low working efficiency in manufacturing the display unit and a corresponding increase in the cost of the display unit. In the prior art described above, there have been some cases where the leakage magnetic field in a VLF band of 2 kHz to 400 kHz, which is regulated by MPR-II Standard, cannot be suppressed to the specified value or less at low cost.

An actual deflection coil has a cone-shape with a larger diameter at the front side (at a face panel side of a cathode-ray tube). For the purpose of improving the quality of display images in a cathode-ray tube, strong distortion is partially provided to a deflection magnetic field. Therefore, a leakage magnetic field does not generally have a symmetry property relative to the center of a deflection yoke due to the influence of an auxiliary coil provided at the rear-end part of the deflection yoke in many cases. In such cases, the leakage magnetic field cannot be cancelled effectively by a cancel magnetic field having two peaks that are symmetric at the front portion and the rear portion of the deflection yoke body. Specifically, when trying to cancel the leakage magnetic field at the front side of a face panel optimally, the cancel magnetic field strengthens the leakage magnetic field at the rear side of a cathode-ray tube in some cases.

SUMMARY OF THE INVENTION

The present invention aims to solve the problems described above in the prior art. An object of the present invention is to provide a display unit that enables reduction in number of additional parts, decrease in leakage magnetic field in a VLF band generated from the display unit in all directions at low cost, and suppression of the leakage magnetic field to the specified value or less according to MPR-II Standard with tolerance.

In order to attain the object described above, a first configuration of a display unit according to the present invention comprises a cathode-ray tube having a neck portion, a deflection yoke, and a driving circuit having a coil. The deflection yoke is mounted at a predetermined position on the periphery of the neck portion. The driving circuit drives the deflection yoke. The display unit is characterized in that a leakage magnetic field generated from the display unit is reduced by canceling out a leakage magnetic field generated from the deflection yoke by a magnetic field generated from the driving circuit. According to the first configuration of the display unit, the leakage magnetic field can be reduced by using the magnetic field generated from the driving circuit that has been provided conventionally. That is, only by specifying the mounting position and direction of the driving circuit, a display unit that enables a leakage magnetic field generated from the deflection yoke body to be reduced effectively can be obtained with a simple technique and without adding new parts. Additionally, the leakage magnetic field can be reduced without increasing power consumption.

In the first configuration of the display unit according to the present invention, it is preferable that the driving circuit is a horizontal deflection circuit that supplies a sawtooth current to a horizontal deflection coil of the deflection yoke. According to this preferable example, a cancel magnetic field having a reverse direction to that of the leakage magnetic field generated from the deflection yoke body and having substantially the same strength as that of the leakage magnetic field can be obtained effectively.

In the first configuration of the display unit according to the present invention, it is preferable that the driving circuit is provided at such a position and in such a direction that the magnetic field generated from the driving circuit cancels out the leakage magnetic field generated from the deflection yoke substantially at the position in front of and 50 cm away from the center of a face panel of the cathode-ray tube. According to this preferable example, the leakage magnetic field generated from the deflection yoke can be reduced effectively by the magnetic field generated from the driving circuit. The expression "the magnetic field generated from the driving circuit" means a magnetic field obtained by integrating all the magnetic fields generated from a sub-resonant coil, a horizontal linearity coil, other coils on a circuit board, other circuit elements, other circuits on a circuit board, and the like.

In the first configuration of the display unit according to the present invention, it is preferable that the coil is provided at such a position and in such a direction that the magnetic field generated from the coil cancels out the leakage magnetic field generated from the deflection yoke substantially at the position in front of and 50 cm away from the center of a face panel of the cathode-ray tube. According to this preferable example, the leakage magnetic field generated from the deflection yoke can be reduced effectively by the magnetic field generated from the coil. In this case, it is preferable that the coil is located between the deflection yoke and the face panel of the cathode-ray tube in the fore-and-aft position, within a width of a display area of the display unit in the right-and-left position, and at the upper or lower portion of the cathode-ray tube. According to this preferable example, the leakage magnetic field generated from the deflection yoke can be reduced further effectively by the magnetic field generated from the coil. The expression "a width of a display area of the display unit" indicates a region that is a little wider than the width of the face panel of the cathode-ray tube and that is within a width of a frame with a picture-frame shape (known as "escutcheon") generally provided around the face panel of the cathode-ray tube. Further, in this case, it is preferable that the coil is a sub-resonant coil. Moreover, in this case, it is preferable that the coil is a linearity coil.

A second configuration of a display unit according to the present invention comprises a cathode-ray tube having a neck portion, a deflection yoke, and a driving circuit. The deflection yoke is mounted at a predetermined position on the periphery of the neck portion of the cathode-ray tube. The driving circuit drives the deflection yoke. The display unit is characterized in that at least one coil is provided on a circuit board of the driving circuit and a leakage magnetic field generated from the display unit is reduced by canceling out the leakage magnetic field generated from the deflection yoke by a magnetic field generated from the coil. According to the second configuration of the display unit, the coil has a function of generating a cancel magnetic field for suppressing the leakage magnetic field and can be provided directly on the driving circuit board by soldering or the like. Therefore, a clamp such as a cancel coil bobbin or the like is not necessary, thus reducing the number of parts. As a result, the number of parts used in constructing a display unit can be reduced and the working efficiency in manufacturing the display unit can be improved. Thus, a cost increase due to suppression of the leakage magnetic field can be restrained to a minimum.

In the second configuration of the display unit according to the present invention, it is preferable that the coil is provided at such a position and in such a direction that the magnetic field generated from the coil cancels out the leakage magnetic field generated from the deflection yoke substantially at the position in front of and 50 cm away from the center of a face panel of the cathode-ray tube. According to this preferable example, the magnetic field generated from the coil can suppress the leakage magnetic field generated from the deflection yoke effectively. In this case, it is preferable that the coil is provided above or below a long side of the face panel of the cathode-ray tube with the long side being in a horizontal direction. According to this preferable example, the leakage magnetic field can be suppressed with relative ease. In this case, it is also preferable that the coil is provided at the face panel side in a cone portion of the cathode-ray tube. According to this preferable example, the coil is provided above or below the cone portion of the cathode-ray tube at the face panel side. Therefore, the leakage magnetic field generated at the face panel side of the cathode-ray tube can be suppressed effectively by the cancel magnetic field generated near the face panel. That is, since the leakage magnetic field can be cancelled directly in front of the position where the leakage magnetic field is measured, the leakage magnetic field generated from the deflection yoke can be cancelled more effectively.

In the second configuration of the display unit according to the present invention, it is preferable that the coil is an air-core coil. This preferable example enables the coil to be formed using a relatively cheap air-core coil, thus obtaining a still cheaper display unit.

DETAILED DESCRIPTION OF THE INVENTION

The present invention will be described further concretely using embodiments as follows.

First Embodiment

Figure 1:
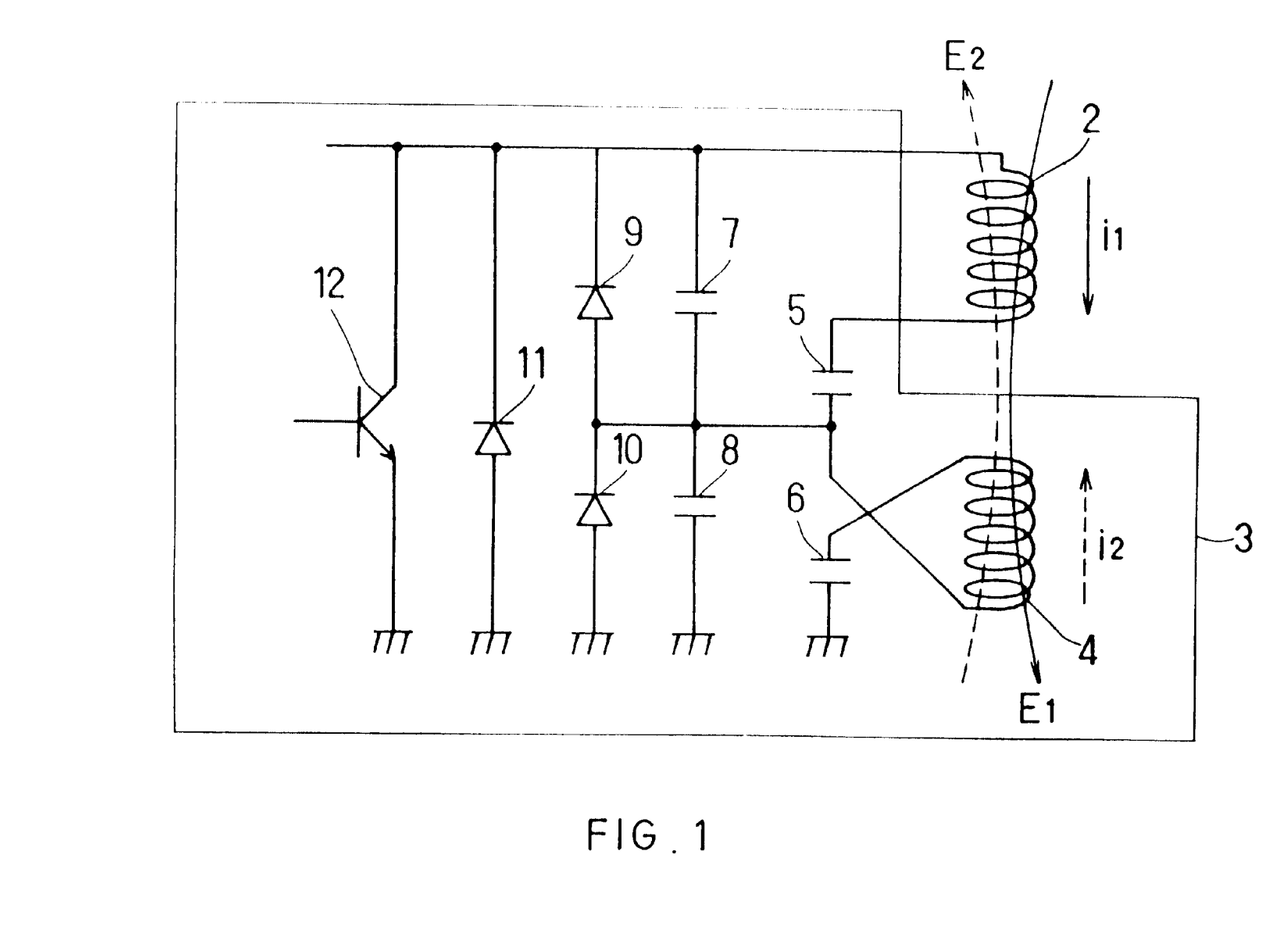
FIG. 1 is a circuit diagram of a deflection yoke and a horizontal deflection circuit for driving the deflection yoke according to a first embodiment of the display unit of the present invention.

FIG. 1 is a circuit diagram of a deflection yoke and a horizontal deflection circuit driving the deflection yoke according to a first embodiment of the display unit of the present invention.

As shown in FIG. 1, a horizontal deflection circuit 3, which is a driving circuit for driving a deflection yoke 2, comprises a sub-resonant coil 4, a first capacitor 5, a second capacitor 6, a third capacitor 7, a fourth capacitor 8, a first diode 9, a second diode 10, a third diode 11, and a transistor 12. The horizontal deflection circuit 3 supplies a sawtooth current to a horizontal deflection coil that forms the deflection yoke 2.

When driving the deflection yoke 2 using the horizontal deflection circuit 3, a current $i_1$ flows in the deflection yoke 2 and a current $i_2$ flows in the sub-resonant coil 4 as shown in FIG. 1. According to the well-known principle, a leakage magnetic field $E_1$ is generated by the current $i_1$, and a magnetic field $E_2$ is generated by the current $i_2$. In this case, the position and the direction of the sub-resonant coil 4 are set so that the vector of the magnetic field $E_2$ generated from the sub-resonant coil 4 cancels out the vector of the leakage magnetic field $E_1$ generated from the deflection yoke 2 substantially at the position in front of and 50 cm away from the center of a face panel of a cathode-ray tube. By arranging the sub-resonant coil 4 comprised in the horizontal deflection circuit (a driving circuit) 3 at such a position and in such a direction, the leakage magnetic field $E_1$ can be reduced effectively by the magnetic field $E_2$.

In this embodiment of the display unit, the sub-resonant coil 4 is arranged between the deflection yoke 2 and the face panel of the cathode-ray tube in the fore-and-aft position, within a width of a display area of the display unit in the right-and-left position, and at the upper or lower position of the cathode-ray tube. The expression "a width of a display area of the display unit" indicates a region that is a little wider than the width of the face panel of the cathode-ray tube and that is within a width of a frame with a picture-frame shape generally provided around the face panel of the cathode-ray tube.

Figure 2:
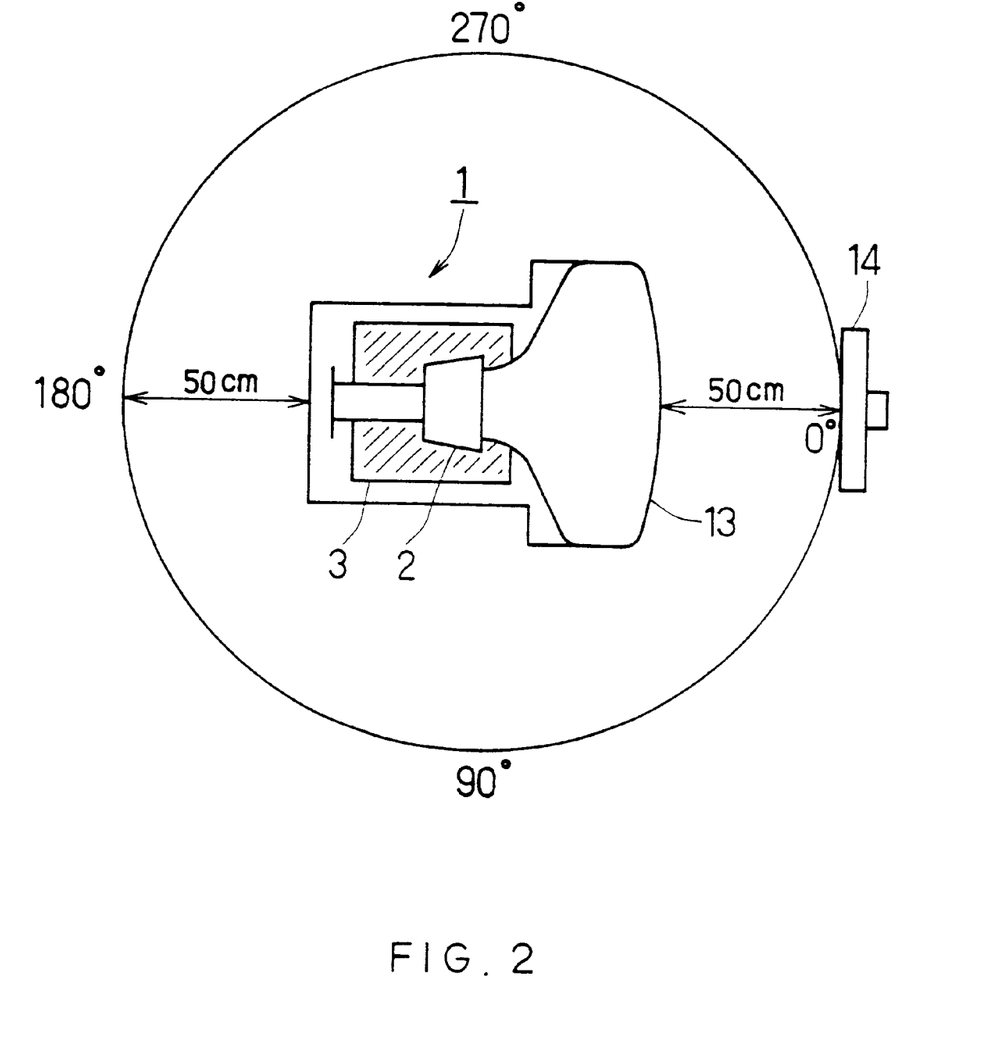
FIG. 2 is an explanatory view showing a method of measuring a leakage magnetic field generated from the first embodiment of the display unit of the present invention and is a plan view showing the display unit seen from the top during the measurement of the leakage magnetic field.
Figure 3:
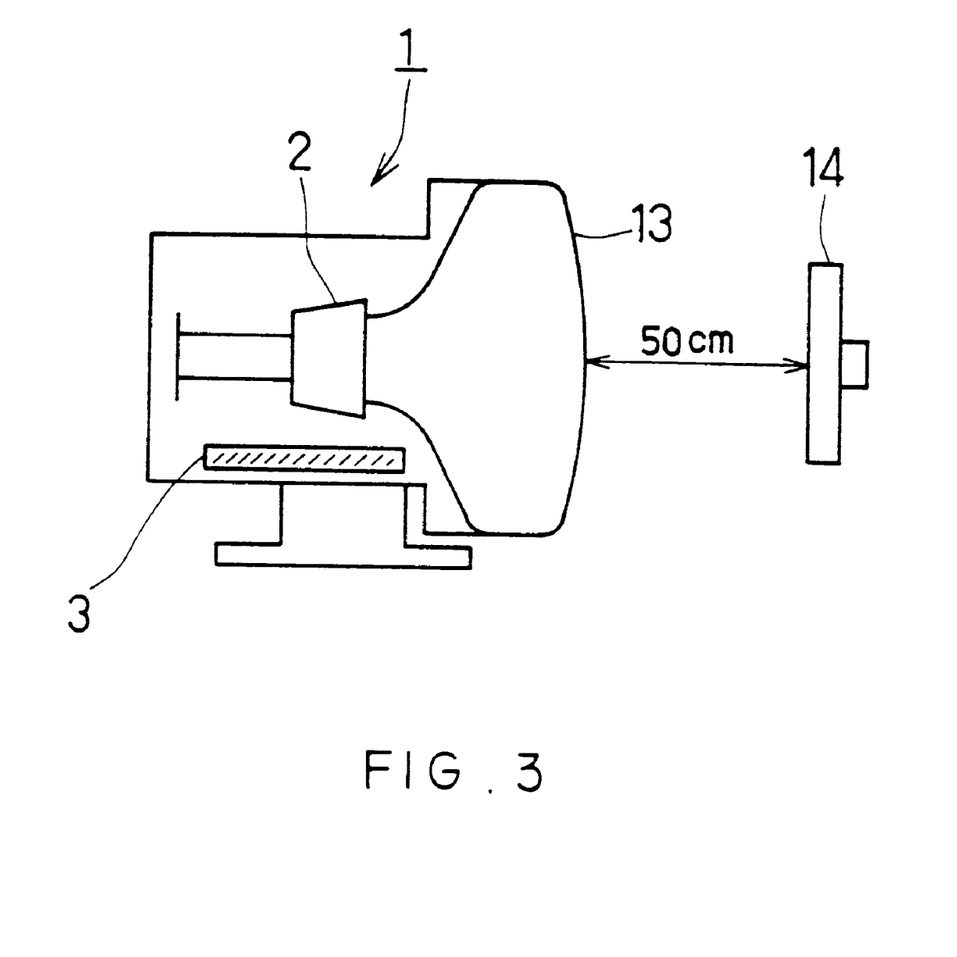
FIG. 3 is an explanatory view showing a method of measuring a leakage magnetic field generated from the first embodiment of the display unit of the present invention and is a plan view showing the display unit seen from the side during the measurement of the leakage magnetic field.

FIGS. 2 and 3 are explanatory views showing a method for measuring a leakage magnetic field in the first embodiment of the display unit according to the present embodiment. FIG. 2 is a plan view showing the display unit seen from the top during the measurement of the leakage magnetic field. FIG. 3 is a side view showing the display unit seen from the side during the measurement of the leakage magnetic field.

In FIGS. 2 and 3, a display unit 1 that is a measuring object comprises a cathode-ray tube 13 having a neck portion, a deflection yoke 2 mounted at a predetermined position on the periphery of the neck portion of the cathode-ray tube 13, and a horizontal deflection circuit 3 that drives the deflection yoke 2. In front of a face panel of the cathode-ray tube 13, a device 14 for measuring magnetic flux density, which is used for measuring a magnetic field, is provided at a position away from the display unit 1 (the cathode-ray tube 13) at a predetermined distance.

The method of measuring a leakage magnetic field in the display unit will be described further in detail as follows. Magnetic fields are measured according to MPR-II Standard (a standard of a VDU measurement that is an international standard). The device 14 is provided at the position in front of and 50 cm away from the center in the horizontal direction and in the vertical direction of a face panel of the cathode-ray tube 13 comprised in the display unit 1 shown in FIGS. 2 and 3. The display unit 1 and the device 14 are arranged as described above, and the strength of the leakage magnetic field generated from the display unit 1 is measured. The result is shown in FIG. 4.

Figure 4:
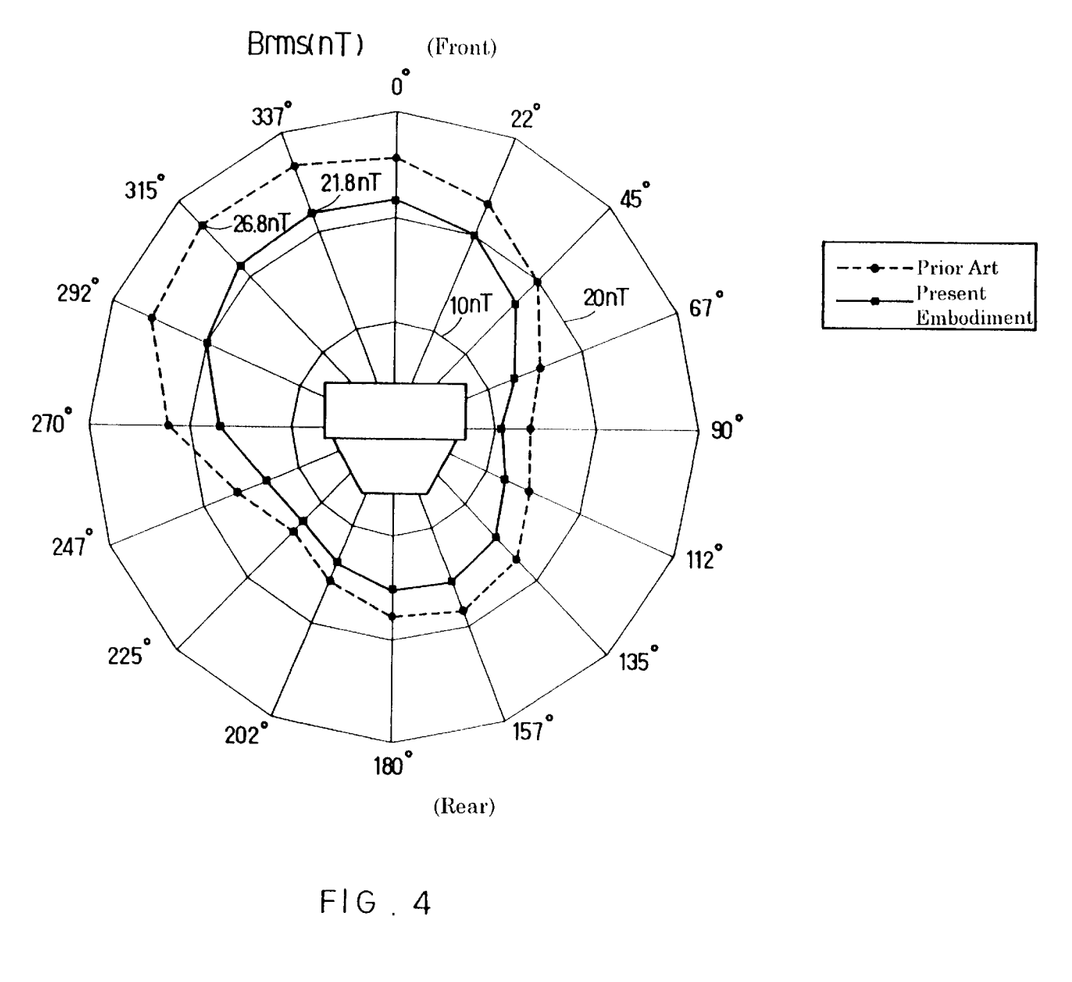
FIG. 4 is a graph showing the comparison between a leakage magnetic field generated from the first embodiment of the display unit of the present invention and the leakage magnetic field generated from a display unit according to a prior art.

FIG. 4 shows a result of the comparison between a leakage magnetic field generated from a display unit according to a prior art (a display unit that has not been treated) and a leakage magnetic field generated from the display unit according to the present embodiment. According to the present embodiment, it was confirmed that generally the leakage magnetic field generated from the display unit was reduced. Concretely, for instance, the magnetic flux density was 26.8 nT at the maximum at a position of 315° and 26.6 nT at the maximum at a position of 337° when measuring the leakage magnetic field generated from the display unit that has not been treated. On the other hand, the magnetic flux density was 21.4 nT at the maximum at a position of 315° and 21.8 nT at the maximum at a position of 337° when measuring the leakage magnetic field generated from the display unit that has been treated. That is, the strength of the leakage magnetic field can be suppressed to the specified value (25 nT) or less according to MPR-II Standard by forming a display unit according to the present embodiment.

As described above, according to the configuration of the display unit of the present embodiment, the leakage magnetic field generated from the deflection yoke 2 can be reduced effectively only by using a magnetic field generated from the sub-resonant coil 4 of the horizontal deflection circuit (driving circuit) 3 that supplies a sawtooth current to the horizontal deflection coil without adding new parts and while maintaining the same configuration as that of a current display unit.

Figure 5A:
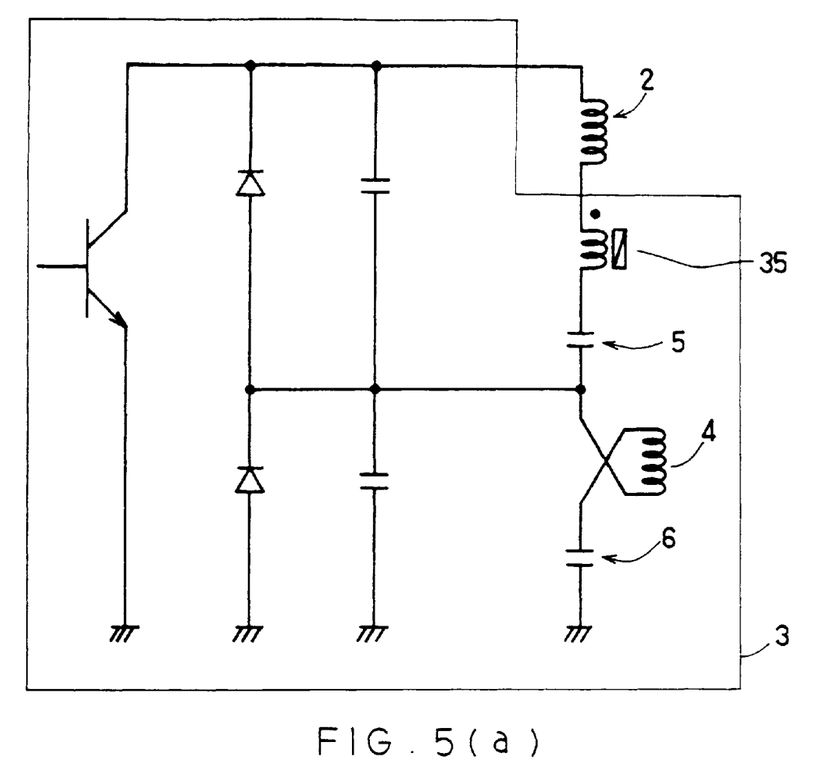
FIG. 5(a) is a circuit diagram showing another configuration of a deflection yoke and a horizontal deflection circuit driving the deflection yoke according to the first embodiment of the display unit of the present invention.
Figure 5B:
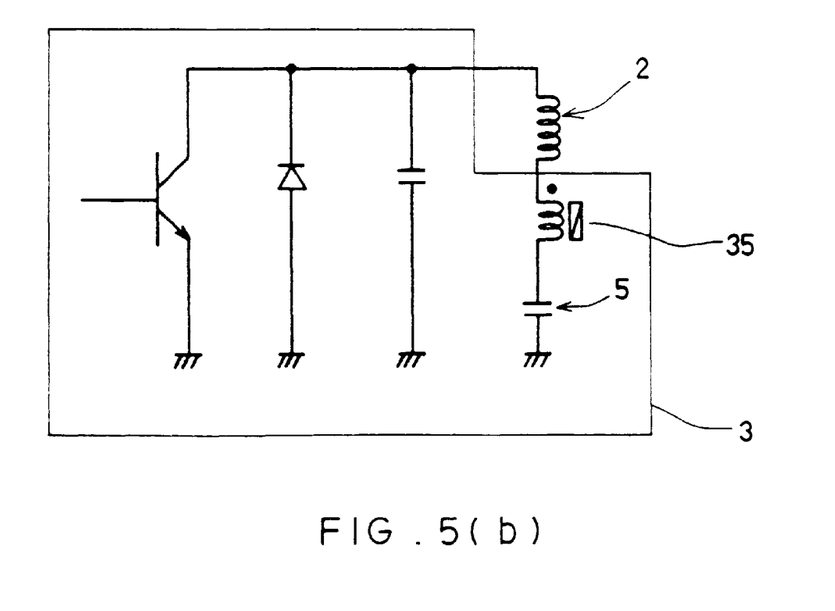
FIG. 5(b) is a circuit diagram showing still another configuration of a deflection yoke and a horizontal deflection circuit driving the deflection yoke according to the first embodiment of the display unit of the present invention.

In the present embodiment, the reference is made to the technique in which the leakage magnetic field generated from the deflection yoke 2 is reduced by using the magnetic field generated form the sub-resonant coil 4 of the horizontal deflection circuit 3. However, the present invention is not limited to this. For example, as shown in FIGS. 5(a) and 5(b), a display unit may be constructed so as to reduce a leakage magnetic field generated from a deflection yoke 2 by using a magnetic field generated from a linearity coil 35 of the horizontal deflection circuit 3 that supplies a sawtooth current to a horizontal deflection coil. Further, a display unit may be constructed so as to reduce the leakage magnetic field by using the magnetic field obtained by integrating all the magnetic fields generated from a driving circuit, that is, from a sub-resonant coil, a horizontal linearity coil, other coils on a circuit board, other circuit elements, other circuit portions on the circuit board, and the like. The same effect as that in the present embodiment also can be obtained in such configurations.

In the present embodiment, reference is made to a technique for reducing the leakage magnetic field generated from the deflection yoke 2 by using the magnetic field generated from the horizontal deflection circuit 3 of a horizontal deflection coil comprised in the deflection yoke 2. However, the present invention is not limited to this. Based on the same concept as that of the present embodiment, for instance, a display unit may be constructed so as to reduce the leakage magnetic field generated from the deflection yoke 2 by using the magnetic field generated from a vertical deflection circuit of a vertical deflection coil comprised in the deflection yoke 2.

Second Embodiment

Figure 6:
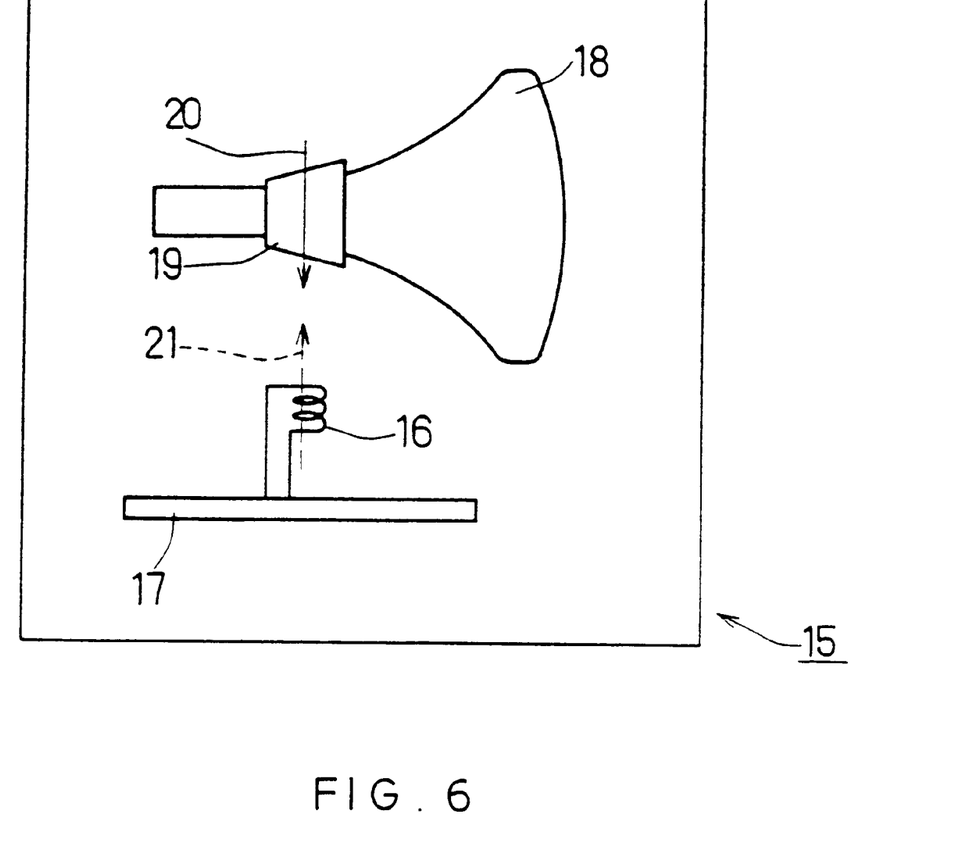
FIG. 6 is a schematic view showing a display unit according to a second embodiment of the present invention.

FIG. 6 is a schematic view showing a second embodiment of the display unit according to the present invention.

As shown in FIG. 6, a display unit 15 according to the present embodiment comprises a cathode-ray tube 18 with a neck portion, a deflection yoke 19, and a driving circuit board 17. The deflection yoke 19 is mounted at a predetermined position on the periphery of the neck portion of the cathode-ray tube 18. The driving circuit board 17 is arranged under the cathode-ray tube 18 and a driving circuit part that drives the deflection yoke 19 is mounted on the driving circuit board 17. On the driving circuit board 17, one cancel coil 16 is provided. The cancel coil 16 is comprised as a part of a horizontal deflection circuit in a driving circuit. The cancel coil 16 is arranged on the driving circuit board 17 so as to locate under the deflection yoke 19. As the cancel coil 16, for example, an air-core coil formed of a copper wire having a diameter of 0.8 mm with a winding number of 20 turns can be used. In FIG. 6, a cancel magnetic field 21 generated from the cancel coil 16 suppresses a leakage magnetic field 20 generated from the deflection yoke 19. The cancel coil 16 is arranged at the position under the deflection yoke 19 and at the position and in the direction where the cancel magnetic field 21 can suppress the leakage magnetic field 20 so as to suppress the leakage magnetic field generated from the display unit 15 to the specified value or less regulated by MPR-II Standard with tolerance.

Figure 7:
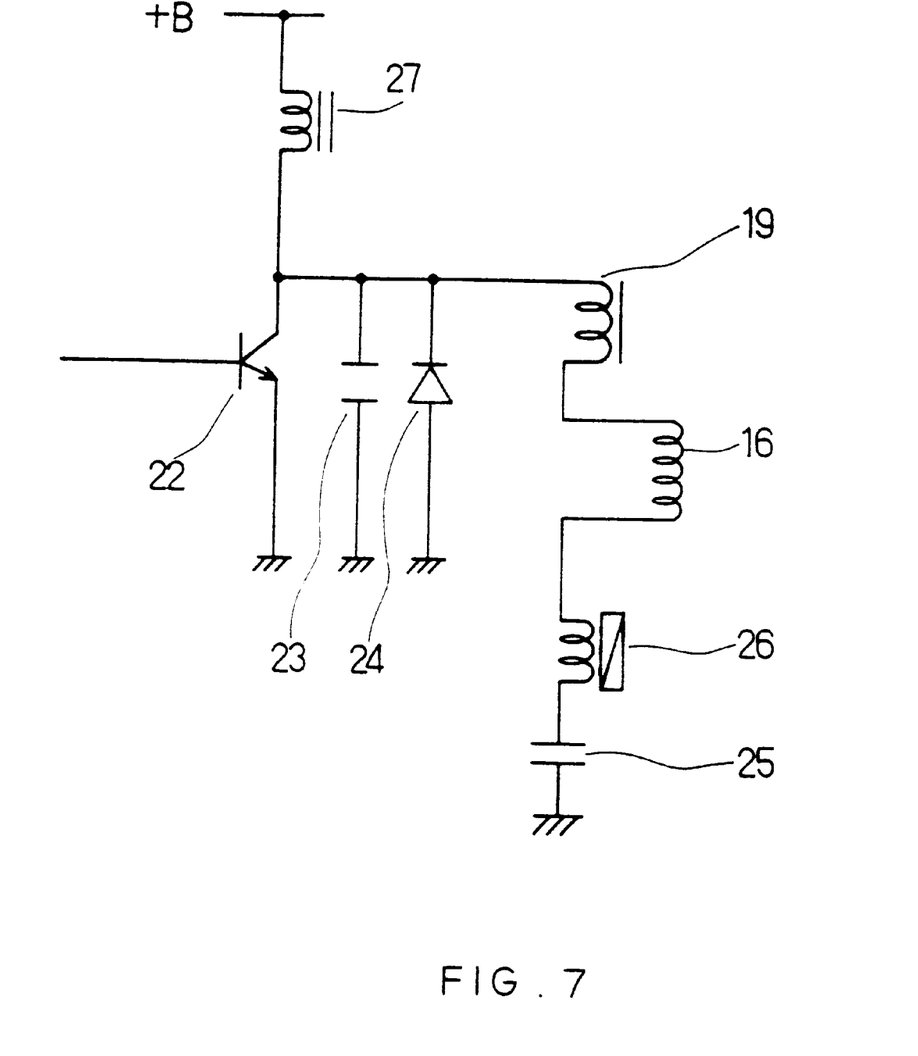
FIG. 7 is a circuit diagram of a cancel coil, a deflection yoke, and a horizontal deflection circuit of the second embodiment of the present invention.

FIG. 7 is a circuit diagram of a cancel coil, a deflection yoke, and a horizontal deflection circuit of the second embodiment of the present invention.

As shown in FIG. 7, a horizontal deflection circuit according to the present embodiment comprises a horizontal output transistor 22, a resonant capacitor 23, a damper diode 24, an S-shape compensation capacitor 25, a linearity coil 26 and a flyback transformer 27. The horizontal deflection circuit, a cancel coil 16, and a deflection yoke 19 are connected as shown in FIG. 6.

Figure 8:
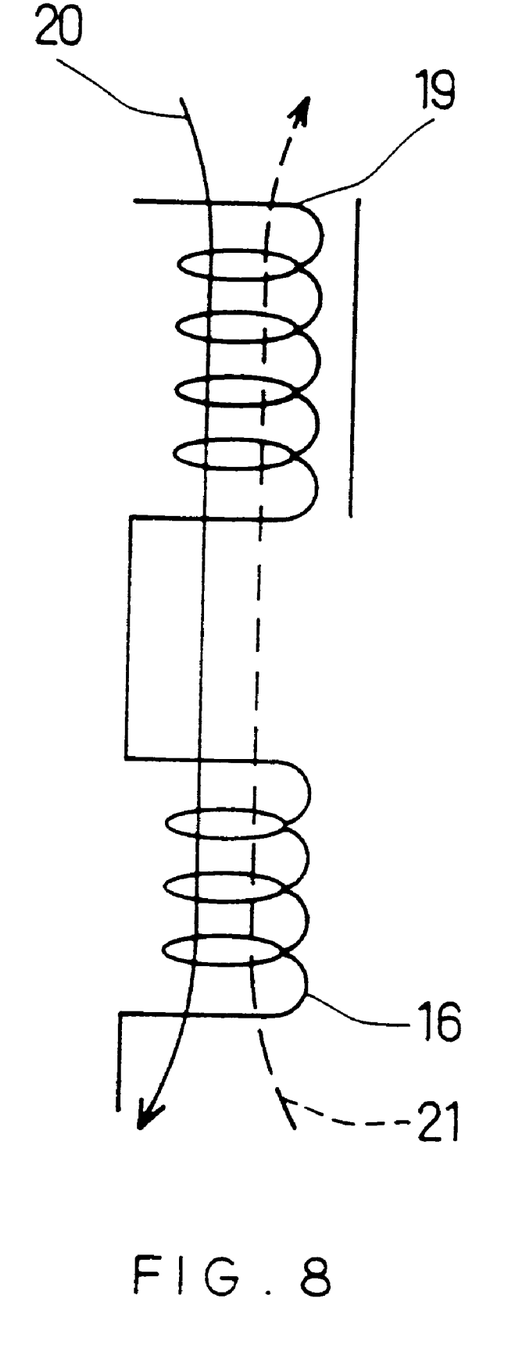
FIG. 8 is a partially enlarged view of FIG. 7.

FIG. 8 is a partially enlarged view of FIG. 7. Concretely, FIG. 8 shows the relationship (the direction of each magnetic field) between a cancel magnetic field 21 generated from the cancel coil 16 and a leakage magnetic field 20 generated from the deflection yoke 19. In the present embodiment, the cancel coil 16 is arranged at such a position and in such a direction that the cancel magnetic field 21 generated from the cancel coil 16 cancels out the leakage magnetic field 20 generated form the deflection yoke 19 substantially at the position in front of and 50 cm away from the center of a face panel of the cathode-ray tube 18. By arranging the cancel coil 16 at such a position and in such a direction, the cancel magnetic field 21 generated from the cancel coil 16 can suppress the leakage magnetic field 20 generated from the deflection yoke 19 effectively.

Figure 9:
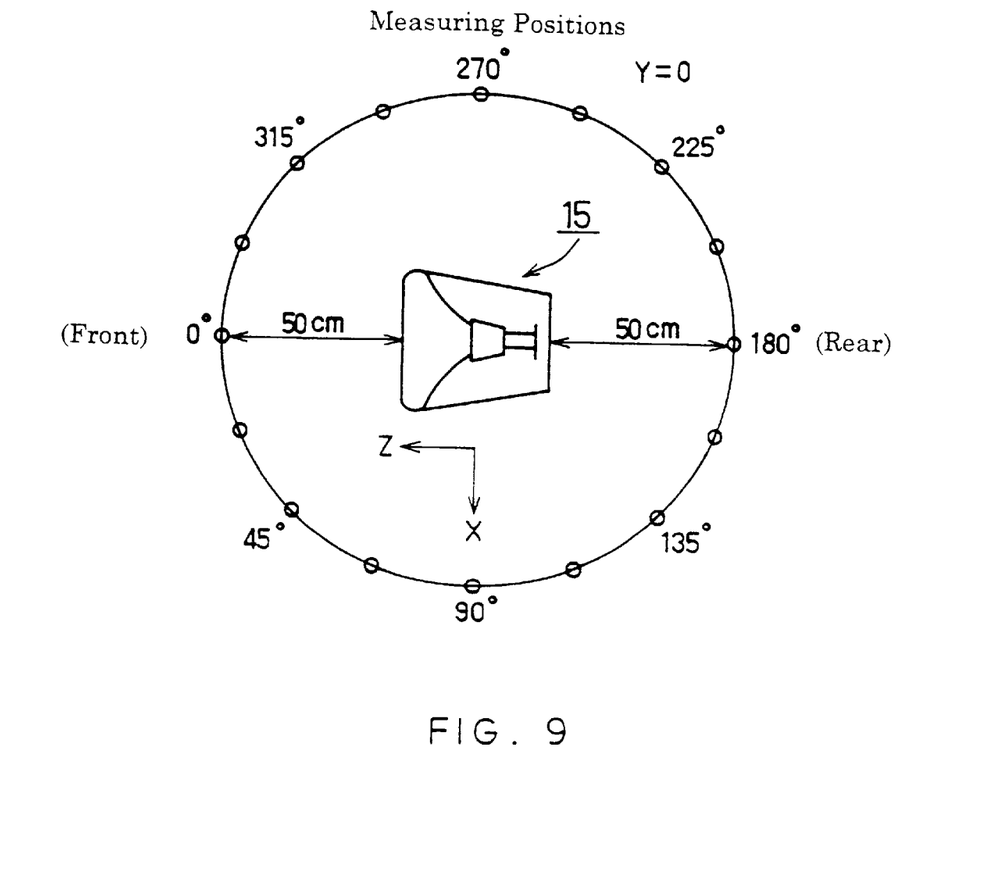
FIG. 9 is an explanatory view showing a method of measuring a leakage magnetic field prescribed by MPR-II Standard in the second embodiment of the present invention.

FIG. 9 is an explanatory view showing a method of measuring a leakage magnetic field according to MPR-II Standard in the second embodiment of the present invention. Concretely, FIG. 9 is a schematic view showing a display unit 15 and measuring positions of a leakage magnetic field generated from the display unit 15.

As shown in FIG. 9, the leakage magnetic field is measured at every 22.5° relative to the center of the display unit 15 on a circumference on a horizontal plane (Y=0 plane) including the tube axis of the display unit 15. In this case, the radius R of the circle on which the measuring positions are located is expressed by the following formula (1), $$R = L/2 + 50 \text{ (cm)}, \quad \text{[Formula 1]}$$

wherein L indicates the whole length (cm) of a display unit.

The following table (Table 1) shows the results of the measurement of a leakage magnetic field according to the measuring method shown in FIG. 9.

TABLE 1

| Measuring Position | Leakage Magnetic Field |
|---|---|
| 0.0° | 22.6 nT |
| 22.5° | 20.9 nT |
| 45.0° | 17.6 nT |
| 67.5° | 13.6 nT |
| 90.0° | 11.2 nT |
| 112.5° | 13.9 nT |
| 135.0° | 17.2 nT |
| 157.5° | 18.9 nT |
| 180.0° | 18.6 nT |
| 202.5° | 16.4 nT |
| 225.0° | 14.0 nT |
| 247.5° | 15.1 nT |
| 270.0° | 19.4 nT |
| 292.5° | 22.3 nT |
| 315.0° | 22.6 nT |
| 337.5° | 22.9 nT |

As is obvious from Table 1, according to the display unit of the present embodiment, the value of leakage magnetic fields can be suppressed to the value 25 nT or less prescribed by MPR-II Standard.

As described above, in the display unit of the present embodiment, the leakage magnetic field is suppressed by arranging the cancel coil 16 at a position under the deflection yoke 19 on the driving circuit board 17. Further, in the display unit of the present embodiment, the number of parts are reduced by keeping the number of cancel coils to the necessary minimum and by omitting a clamp (for example, a cancel coil bobbin) and the like through soldering the cancel coil 16 directly on the driving circuit board 17. Consequently, according to the present embodiment, additional parts such as a clamp for mounting a cancel coil and the like are not necessary and the number of cancel coils itself can be reduced compared to a display unit according to the prior art. Therefore, a low priced display unit having lesser number of parts as a whole and that can suppress a leakage magnetic field generated from the deflection yoke 19 can be obtained. Furthermore, according to the present embodiment, it is possible to keep the cost increase to a minimum and to improve the working efficiency during the manufacture while reducing the number of parts. Thus, a display unit with a lower price than that of a prior art can be obtained. Moreover, in the present embodiment, an air-core coil can be used as the cancel coil 16. Therefore, the cost of the cancel coil 16 can be decreased, thus obtaining a display unit with a further lower price.

Third Embodiment

Figure 10:
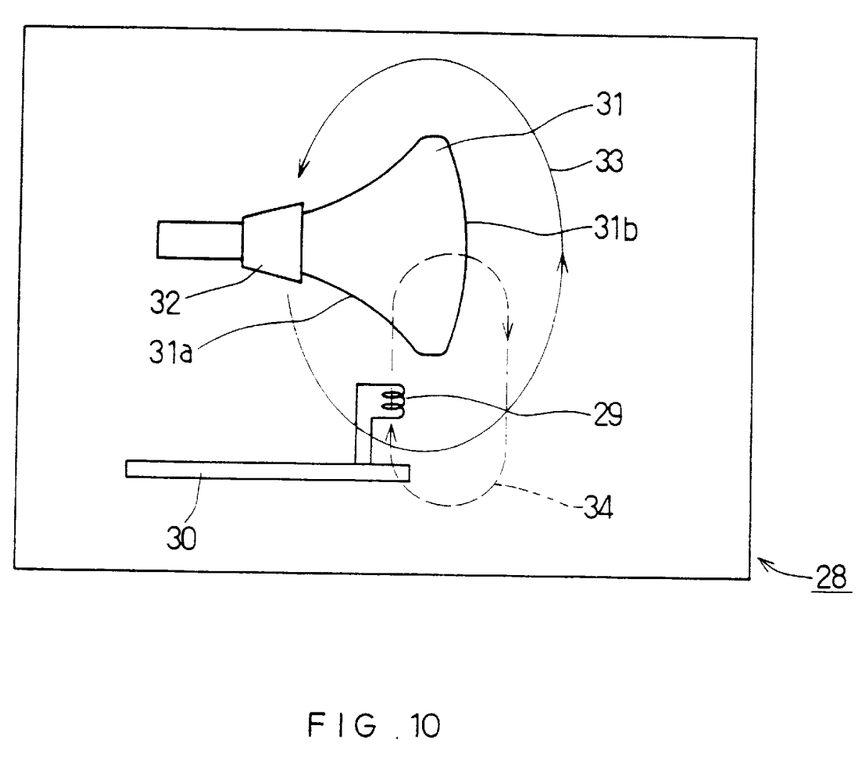
FIG. 10 is a schematic view showing a display unit in a third embodiment of the present invention.

FIG. 10 is a schematic view showing a third embodiment of the display unit of the present invention.

As shown in FIG. 10, a display unit 28 in the present embodiment comprises a cathode-ray tube 31 having a neck portion, a deflection yoke 32, a driving circuit board 30. The deflection yoke 32 is mounted at a predetermined position on the periphery of the neck portion of the cathode-ray tube 31. The driving circuit board 30 is arranged under the cathode-ray tube 31. A driving circuit part that drives the deflection yoke 32 is mounted on the driving circuit board 30. One cancel coil 29 is provided on the driving circuit board 30. The cancel coil 29 is a part of a horizontal deflection circuit in a driving circuit. The cancel coil 29 is arranged so as to be in the vicinity of the position under a cone portion 31a of the cathode-ray tube 31 at the side of a face panel 31b. That is, the arrangement of the cancel coil on the driving circuit board in the display unit according to the present embodiment is different from that according to the second embodiment.

In the present embodiment, the cancel coil 29 is arranged at such a position and in such a direction that a cancel magnetic field 34 generated from the cancel coil 29 cancels out a leakage magnetic field 33 generated from the deflection yoke 32 substantially at the position in front of and 50 cm away from the center of the face panel 31b of the cathode-ray tube 31 as in Second Embodiment. By arranging the cancel coil 29 at such a position and in such a direction, the cancel magnetic field 34 can suppress the leakage magnetic field 33 effectively as in the second embodiment.

Concretely, as shown in FIG. 10, the cancel coil 29 is arranged in the vicinity of the position under the cone portion 31a of the cathode-ray tube 31 at the side of the face panel 31b. Therefore, the cancel magnetic field 34 generated near the face panel 31b of the cathode-ray tube 31 can suppress the leakage magnetic field 33 generated at the side of the face panel 31b sufficiently. That is, according to the present embodiment, since the leakage magnetic field 33 can be cancelled directly in front of the measuring position, the leakage magnetic field generated from the deflection yoke 32 can be cancelled more effectively.

Further, in the present embodiment, the cancel coil 29 that is the source of the cancel magnetic field 34 is located nearer to the face panel 31b compared to the front-edge of a deflection yoke of a prior art. Therefore, when generating a magnetic field that cancels out the leakage magnetic field at the position in front of and 50 cm away from the center of the face panel 31b of the cathode-ray tube 31, where is a measuring position prescribed by MPR-II Standard, the strength of the cancel magnetic field at the rear side of the cathode-ray tube 31 decreases compared to that in the prior art, thus preventing such a disadvantage in the prior art that the leakage magnetic field cannot be cancelled at the rear side of the cathode-ray tube 31 but is strengthened.

In order to confirm the effect of the present embodiment, the value of the leakage magnetic field is measured by the same measuring method as in the second embodiment. The results shown in the following table (Table 2) were obtained.

TABLE 2

| Measuring Position | Leakage Magnetic Field |
|---|---|
| 0.0° | 19.8 nT |
| 22.5° | 18.4 nT |
| 45.0° | 15.3 nT |
| 67.5° | 12.3 nT |
| 90.0° | 10.5 nT |
| 112.5° | 13.3 nT |
| 135.0° | 16.1 nT |
| 157.5° | 17.7 nT |
| 180.0° | 17.8 nT |
| 202.5° | 16.0 nT |
| 225.0° | 13.6 nT |
| 247.5° | 13.1 nT |
| 270.0° | 15.6 nT |
| 292.5° | 18.6 nT |
| 315.0° | 19.2 nT |
| 337.5° | 19.8 nT |

As is apparent from Table 2, according to the display unit of the present embodiment, it is possible to obtain a value of the leakage magnetic field that is below the limiting value of 25 nT regulated by MPR-II standard with tolerance. Further, according to the present embodiment, a display unit with a low price and a small number of parts compared to a display unit of the prior art can be obtained as in the second embodiment.

In the second and third embodiments, the cancel coil is arranged under the deflection yoke or the cone portion of the cathode-ray tube as an example. However, the present invention is not limited to these configurations. For instance, when a cancel magnetic field can suppress a leakage magnetic field, the cancel coil may be arranged suitably at an appropriate position and in an appropriate direction. That is, when a cancel coil with a reverse polarity to the cancel coil 16 or 29 used in the second or third embodiment, respectively, is employed, the same effect as in the second and third embodiments can be obtained by arranging the cancel coil above the deflection yoke or above the cone portion of the cathode-ray tube.

In the second and third embodiments, one cancel coil is provided as an example. However, the present invention is not limited to this configuration. For example, two or more cancel coils may be provided as necessary.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A display unit comprising:
   a cathode-ray tube having a neck portion;
   a deflection yoke mounted at a predetermined position on a periphery of the neck portion, the deflection yoke comprising a horizontal deflection coil;
   a driving circuit which supplies a deflection current to the horizontal deflection coil of the deflection yoke, the driving circuit comprising a sub-resonant coil connected in parallel to a capacitor and a diode;
   wherein the sub-resonant coil is positioned such that a leakage magnetic field generated from the deflection yoke is cancelled by a magnetic field generated from the sub-resonant coil of the driving circuit.

2. The display unit according to claim 1, wherein the driving circuit is a horizontal deflection circuit that supplies a sawtooth current to the horizontal deflection coil of the deflection yoke.

3. The display unit according to claim 1,
   wherein the driving circuit is provided at such a position and in such a direction that the magnetic field generated from the driving circuit cancels out the leakage magnetic field generated from the deflection yoke substantially at the position in front of and 50 cm away from the center of a face panel of the cathode-ray tube.

4. The display unit according to claim 1,
   wherein the sub-resonant coil is provided at such a position and in such a direction that the magnetic field generated from the sub-resonant coil cancels out the leakage magnetic field generated from the deflection yoke substantially at the position in front of and 50 cm away from the center of a face panel of the cathode-ray tube.

5. The display unit according to claim 4,
   wherein the sub-resonant coil is located between the deflection yoke and the face panel of the cathode-ray tube in the fore-and-aft position, within a width of a display area of the display unit in the right-and-left position, and at the upper or lower portion of the cathode-ray tube.

6. The display unit according to claim 4, wherein the driving circuit further comprises a linearity coil.

* * * * *